(12) United States Patent
Zhu et al.

(10) Patent No.: US 8,597,482 B2
(45) Date of Patent: Dec. 3, 2013

(54) PROCESS FOR DEPOSITING RINSABLE SILSESQUIOXANE FILMS ON METALS

(75) Inventors: Danqing Zhu, Mason, OH (US); William J Vanooij, Fairfield, OH (US); Wenchao Zhang, Fairfield, OH (US)

(73) Assignee: ECOSIL Technologies LLC, Fairfield, OH (US)

( * ) Notice: Subject to any disclaimer, the term of this patent is extended or adjusted under 35 U.S.C. 154(b) by 219 days.

(21) Appl. No.: 13/230,160

(22) Filed: Sep. 12, 2011

(65) Prior Publication Data

US 2012/0061248 A1    Mar. 15, 2012

Related U.S. Application Data

(60) Provisional application No. 61/382,645, filed on Sep. 14, 2010.

(51) Int. Cl.
  *C25D 13/20*    (2006.01)
  *B05D 3/00*    (2006.01)
  *C23C 22/34*    (2006.01)

(52) U.S. Cl.
  USPC ............ 204/486; 204/510; 427/387; 148/247

(58) Field of Classification Search
  USPC .................... 204/486, 510; 427/387; 148/247
  See application file for complete search history.

(56) References Cited

U.S. PATENT DOCUMENTS

| | | | |
|---|---|---|---|
| 3,934,334 A | 1/1976 | Hanni | |
| 5,108,793 A | 4/1992 | van Ooij et al. | |
| 5,292,549 A | 3/1994 | van Ooij et al. | |
| 5,753,316 A | 5/1998 | Brent et al. | |
| 5,759,629 A | 6/1998 | van Ooij et al. | |
| 5,942,638 A | 8/1999 | Lichtenhan et al. | |
| 6,416,869 B1 | 7/2002 | van Ooij et al. | |
| 6,756,079 B2 | 6/2004 | van Ooij et al. | |
| 6,758,916 B1 | 7/2004 | McCormick | |
| 6,919,469 B2 | 7/2005 | van Ooij et al. | |
| 6,927,270 B2 | 8/2005 | Lichtenhan et al. | |
| 7,053,167 B2 | 5/2006 | Ito et al. | |
| 2003/0113523 A1 | 6/2003 | Landi et al. | |
| 2003/0185990 A1 | 10/2003 | Bittner et al. | |
| 2005/0058843 A1 | 3/2005 | van Ooij et al. | |
| 2006/0093755 A1 | 5/2006 | Bittner et al. | |
| 2008/0026151 A1 | 1/2008 | Zhu et al. | |
| 2008/0118646 A1 | 5/2008 | Zhu et al. | |
| 2009/0111938 A1 | 4/2009 | Hazan | |
| 2009/0155473 A1 | 6/2009 | van Ooij et al. | |
| 2010/0075172 A1 | 3/2010 | Koch et al. | |

FOREIGN PATENT DOCUMENTS

JP    2006-192778 A    12/1994
WO    2004/009717 A1    1/2004

OTHER PUBLICATIONS

International Search Report and Written Opinion, PCT/US11/51505, mailed Feb. 2, 2012.
SIGMA-Aldrich Fine Chemicals, Silsesquioxanes, ChemFiles, vol. 1, No. 6, 2001, Aldrich, St. Louis, USA, 14pp.
SIGMA-Aldrich, Polyhedral Oligomeric Silsesquioxanes (POSS) Nanohybrids: Properties and Processing Methods, AZoJono—Journal of Nanotechnollogy Online, 2007, USA, 7 pp.
Xi Zhang, et al., Simulations of Organic-tethered Silsesquioxane Nanocube Assemblies, Mater. Res. Soc. Symp. Proc., vol. 847, Materials Research Society, USA, 2005, 5pp.
International Search Report and Written Opinion, PCT/US07/84889, mailed Apr. 8, 2008.

*Primary Examiner* — Kishor Mayekar
(74) *Attorney, Agent, or Firm* — Wood, Herron & Evans, LLP

(57) ABSTRACT

Cleaned metal surfaces are coated with an aqueous anti-corrosion treatment. The anti-corrosion treatment includes an organofunctional silsesquioxane and a fluoro metallic acid such as $H_2TiF_6$, $H_2ZrF_6$, as well as others and blends. The metal surface can be rinsed immediately after coating, making this anti-corrosion treatment suitable for preparing a metal surface for electrocoating.

12 Claims, No Drawings

PROCESS FOR DEPOSITING RINSABLE SILSESQUIOXANE FILMS ON METALS

RELATED APPLICATIONS

This application claims the benefit of U.S. Provisional Application No. 61/382,645, filed on Sep. 14, 2010, the disclosure of which is incorporated herein in its entirety.

BACKGROUND OF THE INVENTION

Unprotected metal surfaces can suffer severe corrosion when exposed to the environment. To protect metal surfaces from corrosion, the surfaces are often treated with compositions, such as zirconium or chromium compounds, as well as phosphates such as iron phosphate and zinc phosphate. Zirconium, iron phosphate and zinc phosphate provide corrosion protection by barrier action. Iron phosphate, zinc phosphate and chromate treatments are also conversion coatings. Silsesquioxanes also provide corrosion protection, but not corrosion inhibition. Each of these treatments has disadvantages such as inadequate protection of the metal surface from the environment, expense, toxicity, and not being environmentally friendly.

Prior to painting, metal surfaces need to be pretreated chemically to improve paint adhesion as well as enhanced corrosion resistance. Conventional methods such as chromate and phosphate-based pretreatments provide these properties to metal substrates, yet they also pose human safety and environmental concerns.

Silsesquioxane-based pretreatment can provide satisfactory performance on multiple metals under various paints except electrocoat paints. This is due to the fact that a freshly deposited silsesquioxane film or not fully dried silsesquioxane film is not water-rinsable. It has to be cured first by drying. If not cured, it washes off.

This curing aspect of the silsesquioxanes limits their use in many important applications, in particular, electrocoating. Electrocoating involves coating metal with a cathodic or anodic electrocoat system. Such systems are widespread and used in the automotive industry, the appliance industry and consumer electronics industry. Electrocoating paint applications require that the metal entering the tanks cannot contain any water-soluble species as that would contaminate the e-coat bath. Therefore, the metal has to be thoroughly rinsed immediately after leaving the metal pretreatment tanks. For that reason, silsesquioxanes are not used in industry as a pretreatment prior to electrocoating. The time available between metal pretreatment and e-coating on industrial lines typically is not more than two minutes.

SUMMARY OF THE INVENTION

The present invention is premised on the realization that silsesquioxanes can be deposited onto metal and immediately rinsed with deionized water so that the films can be e-coated and will not contaminate the e-coat bath. More particularly, the present invention incorporates a metal fluoroacid, such as hexafluorozirconic acid, into the aqueous solution of silsesquioxane. Surprisingly, this modification of the silsesquioxane film permits immediate rinsing of the silsesquioxane and produces films that significantly improve the corrosion performance of the e-coated metal.

The coating pretreatment of the present invention is also particularly useful for powder coating because it can be applied to a metal surface and dried without rinsing and then subsequently powder coated.

Typical organofunctional silsesquioxanes useful in the present invention are low molecular weight oligomers formed in solution from single organofunctional silane precursors or between two or more different organofunctional silane precursors, one of which may contain an amino group.

Because of the presence of primary amino groups in the solution of the silsesquioxanes, such pre-hydrolyzed VOC-free solutions are completely stable over time. The amino group stabilizes the hydrolyzed silanol groups and prevents their condensation. Thus, such solutions are ideal for metal treatment. Because of their high solution pH, they are well suited for treatment of carbon steels, such as, cold-rolled and hot-rolled steels.

Particularly suitable acids include hexafluorozirconic acid, hexafluorotitanic acid, hexafluorohafnic acid and mixtures thereof, as well as others.

The coating of the present invention can be over-coated with various electrocoating compositions, in particular epoxies and acrylates, and further can be used as a pretreatment for basically any organic coating systems. This coating improves paint adhesion and deters corrosion.

The objects and advantages of the present invention will be further appreciated in light of the following detailed description.

DETAILED DESCRIPTION

According to the present invention, a metal surface is coated with an aqueous solution of a metal fluoro acid and a silsesquioxane. This aqueous-based coating can be immediately rinsed with deionized water and subsequently processed, such as through an electrocoating bath.

The silsesquioxanes generally include an organofunctional group. The organofunctional groups may include any group that is compatible with subsequent coating compositions. For example, amino substituted silsesquioxanes are particularly compatible with subsequent epoxy and polyester coatings. Examples of organofunctional groups contemplated in the present invention include alkyl alkoxy groups, amino, ureido, epoxy, vinyl, cyanato, urethane, methacrylato, isocyanate, acrylato, sulfane, or mercapto functionalities. Organofunctional oligomers can also be formed from organofunctional silanes reacted with nonfunctional silanes.

The organofunctional siloxane oligomers for use in the present invention include commercially available fully hydrolyzed linear silsesquioxanes, which may be partially crosslinked with organic byproducts removed. Examples of siloxane oligomers are aminosilsesquioxane, aminopropylsilsesquioxane oligomer, aminopropylsilsesquioxane-methylsilsesquioxane, which is a copolymer oligomer, and 3((2-aminoethyl)aminopropyl)silanetriol homopolymer. Additional commercially available siloxane oligomers, such as for example, aminopropylsilsesquioxane-vinylsilsesquioxane, are available for use in the present invention.

The organofunctional siloxane oligomers for use in the present invention should have a molecular weight in the range of about 250 to about 650. Preferably, the molecular weight of the organofunctional siloxane oligomers is less than about 500.

The aqueous coating solution of organofunctional siloxane oligomer is made by diluting the desired amount of organofunctional siloxane oligomer in deionized water and adjusting the pH with an acid or a base. Specifically, the organofunctional siloxane oligomer of the present invention is diluted in deionized water in a range of about 0.01 wt.-% to about 10 wt.-%. In one embodiment, the organofunctional siloxane oligomer is diluted in the aqueous solution in a range of about 0.02 wt.-% to about 2 wt.-%. In another embodiment, the organofunctional siloxane oligomer is diluted in the aqueous solution to about 0.05 wt.-% to about 1 wt.-%. This is combined with the metal fluoro acid.

The metal fluoro acids have the formula $H_2XF_6$ where X is Si, Ti, Zr, Hf or $H_3XF_6$ where X is Al or B. Particular metal fluoro acids include $H_2ZrF_6$, $H_2TiF_6$, $H_2HfF_6$. Typically, the zirconic or titanic acids will be used in the present invention. Blends of the zirconic and titanic acids have shown particular performance enhancement and corrosion resistance. A mixture of 3:1 by weight zirconium/titanium shows a particular improvement in corrosion inhibition.

Generally, the molar ratio of silsesquioxane to metal fluoro acid will be greater than 1, generally 1.5 or higher. Exemplary concentrations are further shown in the Examples, below.

The aqueous solution of organofunctional siloxane oligomers can optionally include additional corrosion inhibitors. Corrosion inhibitors as additives in the silsesquioxane and metallic acid solution may include water-soluble phosphorus-containing compounds, vanadium-containing compounds, rare-earth compounds, thiourea, or nitrites and many others. Suitable water-soluble compounds include, but are not limited to, orthophosphoric acid, orthophosphates, polyphosphoric acids, polyphosphates, phosphate esters, EDTA, and phosphonic acids. Vanadium-containing compounds include, but are not limited to, ammonium vanadate, sodium metavanadate, and vanadyl acetylacetonate. Rare-earth compounds include cerium chloride, cerium nitrate, cerium acetate and cerium sulfate.

Nanoparticles as additives in the silsesquioxane and metallic acid solution include silica, zinc oxide, titanium dioxide, aluminum oxide, silicon carbide and cerium oxide. In most cases, their water dispersions are used.

Dispersed polymers such as epoxies, acrylates, polyurethane or mixtures of the same can also be added to the coating. For use in the present invention a variety of water dispersible resins can be employed including epoxy resins, novolac resins, acrylate resins, and polyurethane resins. Generally, 0.05 to 10% by weight of the resin (solids) reactive to the silsesquioxane will be added.

The resin dispersion may be purchased commercially and can include, for example, Epi-rez 5522-WY-55, a 55% solids dispersion of a modified polyfunctional epoxy resin in water and 2-propoxy ethanol, (available from Resolution Performance LLC), or Epi-rez WD 510, a water-reducible epoxy resin, or ECO CRYL 9790.

The coating solution is formed at room temperature by simply blending the selected silsesquioxane with the selected metal fluoro acid at the desired concentration. No additional heating is required. The pH of the coating solution can be from about 1 to about 12. If desired, additional hydrofluoric acid or ammonium bifluoride can be added to the coating solution to adjust the pH. These also act as etchants and improve the adhesion of the coating onto the metal surface.

The aqueous solution of the present invention can be used to treat any metal surface that requires protection from corrosion and paint adhesion. Exemplary metal surfaces include carbon steel, stainless steel, galvanized steel, galvanneal, iron, aluminum, magnesium and alloys of these metals, as well as others.

To apply the coating of the present invention, the metal surface to be treated is first cleaned to remove organic and inorganic contaminants. This cleaning can be achieved by using common industrial cleaners such as alkaline cleaners, acid cleaners and neutral cleaners. Other surface preparation methods are also feasible here, such as solvent cleaning, mechanical abrasion and grit blasting.

The aqueous coating solution can be applied to the metal surface by any method known in the art that is used to apply a liquid to a surface such as, for example, dip coating, spraying, rolling, or brush application. The metal surface is exposed to the organofunctional siloxane oligomer for about 1 second to about 120 seconds, preferably for about 3 seconds to about 90 seconds. Generally the metal surface is exposed to the coating solution for about 5 seconds to about 60 seconds.

Immediately subsequent to coating the metal surface, (i.e., before the applied coating solution dries) the metal surface can be rinsed with de-ionized water and then can be subsequently coated. If the intended process is an electrocoating process, the metal surface is immediately immersed in an electrocoating bath. The electrocoating solution can be any commercially available e-coat solution including epoxies and acrylates.

When pretreatment of the present invention is used for articles which are to be powder-coated, the pretreatment can be used as a dry-in-place treatment. In other words, the metal surface is coated as described above and is subsequently allowed to dry without rinsing. Once dried, it is powder coated.

The pretreatment composition of the present invention can further include a variety of different additives. For example, colorants, such as metalloorganic complexes can be added to the composition so that the coating can be visualized.

Further, although it is preferred to formulate the composition with de-ionized water, if hardness ions are present chelating agents such as phosphates and EDTA and the like can be added in an amount effective to reduce or sequester the hardness ions, such as calcium and the like.

The present invention can further be modified by adding typical amounts of corrosion inhibitors such as phosphates, phosphonates, phosphoric acid, EDTA, and the like. These would be generally present in an amount of about 10-100 ppm in the coating composition. Biocides can also be added, if necessary. Further, surfactants, including nonionic, cationic and anionic surfactants, can be added to improve the wettability of the substrates.

The invention will be further appreciated in light of the following examples:

EXAMPLE 1

Pretreatment of Cold-Rolled Steel (CRS) Under a Polyester Powder Paint

CRS panels obtained from ACT were first cleaned with a 7% Calclean AM 800 solution from Calvary Industries, Inc., at 60° C. for 5 min., which was followed by tap water rinsing and DI- water rinsing. The cleaned panels were then immersed for 60 seconds in $H_2TiF_6$ or $H_2ZrF_6$-modified aminopropyltrialkoxy oligomer (APSMS), also referred to as aminopropylsilsesquioxane methylsilsesquioxane. The formulations are shown in Table 1. This dipping process was immediately followed by two DI water rinse steps. The treated CRS panels were then powder-coated with TGIC-cured polyester powder coat. The salt spray test (SST) results after 430 hrs of the scribed panels are shown in Table 2. The dry film thickness (DFT) was around 60-75 μm. The controls were CRS panels pretreated with Zr-based pretreatment products, labeled 1 and 2. The standard pretreated panels were purchased from ACT Test Panels Inc, Hillsdale, Mich.

TABLE 1

$H_2TiF_6$ or $H_2ZrF_6$-modified APSMS (parts by weight)

| Sample ID | APSMS | $H_2TiF_6$ | $H_2ZrF_6$ | DIW |
|---|---|---|---|---|
| T6 | 0.3 | 0.7 | — | Balance |
| T6-A | 0.3 | 0.3 | 0.03 | Balance |
| T6-B | 0.3 | 0.2 | 0..05 | Balance |

TABLE 2

SST results for PET-powder-coated CRS after 430 hrs

| Sample ID | DFT (mil) | Creep (mm) |
|---|---|---|
| T6 | 2.9 | Large delamination |
| T6-A | 2.1 | 2.0 |
| T6-B | 2.2 | 1.5 |
| Commercial 1 | 3.9 | 4.5 |
| Commercial 2 | 2.2 | 1.5 |

$H_2TiF_6$ was obtained as a 45 wt.-% aqueous solution. $H_2ZrF_6$ was a 60-wt.-% aqueous solution. APSMS was a 22-25 wt.-% aqueous solution. DIW is de-ionized water.

These results indicate that a mixture of 3:1 in Zr/Ti shows the best corrosion performance and that the performance is very similar to the best Zr-based treatment currently on the market. System T6 with an $H_2TiF_6$-only addition has a rather poor performance.

EXAMPLE 2

Pretreatment of Hot-Dip Galvanized Steel (HDG) Under a Polyester Powder Paint Hot-dip galvanized steel (HDG) panels from ACT were cleaned with a 7% Calclean AM 800 solution at 60° C. for 5 min., which was followed by tap water rinsing and DI water rinsing. The cleaned HDG panels were then immersed into an $H_2TiF_6$-modified APSMS aqueous solution at different levels for 60 seconds, immediately followed by 2 steps of DI water rinses. The formulation of the dipping solution is shown in Table 3. The treated HDG panels were then powder-coated with a TGIC-cured polyester powder paint. The dry film thickness was 60-75 μm. The controls were APSMS-only solutions. A 500-hr SST performance result is shown in Table 4.

TABLE 3

$H_2TiF_6$-modified APSMS (weight parts)

| Sample ID | APSMS | $H_2TiF_6$ | DIW |
|---|---|---|---|
| T1 | 0.6 | 0.016 | balance |
| T2 | 0.6 | 0.032 | balance |
| T3 | 1.2 | 0.064 | balance |
| 1 | 0.3 | — | balance |
| 2 | 0.6 | — | Balance |
| 3 | 1.2 | — | balance |

$H_2TiF_6$ was a 45-wt.-% solution. APSMS was a 22-25 wt.-% aqueous solution.

TABLE 4

500-hr SST results for PET-powder-coated HDG

| Sample ID | Creep (mm) |
|---|---|
| T1 | 0.5 |
| T2 | 0.75 |
| T3 | 0.75 |
| 1 | 7.5 |
| 2 | 12.0 |
| 3 | Large delamination |

The controls were APSMS solutions without the $H_2T_iF_6$ addition. The main effects studied here were the addition of the $H_2TiF_6$ and the concentration of APSMS or of the mixture.

The results indicate that with and without $H_2TiF_6$ the corrosion protection of the HDG decreases with concentration. Apparently, thinner films work better. However, the three solutions containing the small amounts of $H_2TiF_6$ are considerably better than the ones without the addition.

EXAMPLE 3

Pretreatment of Cold-Rolled Steel (CRS) Under a Cathodic Electrocoat Paint

The compositions of Table 2 were used here again, but the variations were that an electrocoat was used instead of a powder paint and a different accelerated corrosion test was used, namely, the cyclic GM9540P automotive test. This test uses considerably less salt than the continuous salt exposure of the B-117 test. Also, the solutions were used as a pretreatment of CRS and as a post treatment (post rinse) of the two commercial zirconium processes. Bonderite 1000 (an iron phosphate treatment) was used as a control in addition to the two commercial zirconium processes.

The CRS panels were cleaned as in Example 1, then immersed for 60 s in the solutions of Table 2. This was immediately followed by two DI water rinses. The panels were then immediately e-coated with an automotive epoxy electrocoat system using the standard deposition conditions for this coating as obtained from PPG. The dry film thickness was controlled at around 1 mil (25 μm).

The results of this experiment are shown in Table 5 in terms of the creep from the scribe after 20 cycles of the test.

TABLE 5

20-cycle GM9540P test results for epoxy E-coated CRS

| Sample ID | DFT, mil | Creep, mm |
|---|---|---|
| T6 | 0.95 | 2.0 |
| T6-A | 1.3 | 1.25 |
| Commercial 1 + T6 | 0.9 | 1.5 |
| Commercial 1 + T6-A | 0.95 | 1.5 |
| Commercial 1 + T6-B | 1.0 | 1.75 |
| Commercial 1 | 1.3 | 3 |
| Commercial 2 | 1.2 | 3.25 |
| Iron Phosphated | 1.2 | 1.5 |
| Zinc Phosphated | 1.3 | 1.25 |

The best pretreatment for CRS currently available in the industry is zinc phosphating. The data of Table 5 demonstrates that process T6-A is equivalent to zinc phosphating and, secondly, that the performance of the commercial process number 1 can be improved markedly by using T6 or T6-A as a post rinse. Therefore, the use of APSMS/$H_2XF_6$ mixtures (with X=Ti and/or Zr) as post rinses of other metal pretreatments, such as phosphate or the newer Zr processes, improves the corrosion resistance of the entire painted systems.

EXAMPLE 4

Pretreatment of Hot-Dip Galvanized Steel (HDG) Under a Cathodic Electrocoat Paint The same materials and conditions were used here as in Example 3, except that the substrate was HDG rather than CRS. HDG sheet material is often zinc phosphate treated or zinc phosphated. The hot-dip galvanized steel panels from ACT were cleaned with a 7% Calclean AM 800 at 60° C. for 5 min., which was followed by tap water rinsing and DI water rinsing. The cleaned HDG panels were then immersed for 60 s in the $H_2TiF_6$- or $H_2ZrF_6$-modified APSMS solutions of Table 2. This step was followed by two steps of DI water rinses immediately after dipping. The treated HDG was then immediately e-coated with a PPG automotive cathodic epoxy e-coat system. The dry film thickness was controlled to about 1 mil (25 µm). A 20-cycle GM9540P test result is shown in Table 6. The controls were two commercial Zr-based products, and a commercial zinc phosphate process with a non-chromate sealer.

Although the systems T6 and T6-A do not quite reproduce the performance of zinc-phosphated HDG, we observe that they do improve the performance of commercial Zr-based process, especially T6-C. The formula of T6-C is similar to T6 with $H_2ZrF_6$ used instead of $H_2TiF_6$. The Zr-based processes are widely used in industry. APSMS/$H_2XF_6$ systems (with X=Ti and/or Zr) can be used as post rinses of Zr-based metal pretreatments and of phosphates as well.

TABLE 6

20-cycle GM9540P test results for epoxy E-coated HDG

| Sample ID | DFT, mil | Creep, mm |
| --- | --- | --- |
| T6 | 1.2 | 1.25 |
| T6-A | 1.3 | 0.75 |
| Commercial 1 + T6 | 1.0 | 0.6 |
| Commercial 1 + T6-A | 1.0 | 0.5 |
| Commercial 1 + T6-B | 1.1 | 0.75 |
| Commercial 1 + T6-C | 1.1 | 0.25 |
| Commercial 1 | 1.3 | 0.5 |
| Commercial 2 | 1.3 | 0.75 |
| Zinc Phosphated | 1.0 | 0.25 |

EXAMPLE 5

Pretreatment of the Aluminum Alloy AA2024-T3 Under Military Primers

The alloy AA2024-T3 is widely used in aerospace. Its corrosion is difficult to control by paints and pretreatments because the major alloying component is copper. This metal forms intermetallic precipitates which, on the one hand, gives the metal the high strength that is desired for this application, but on the other hand, strongly reduces the inherent corrosion resistance of aluminum.

Chromate pretreatments and chromate anti-corrosion pigment in primers are still widely used in aerospace applications of this metal.

Al 2024-T3 panels from ACT were cleaned with a 7:% Calclean AM 800 at 60° C. for 5 min., which was followed by tap water rinsing and DI water rinsing. The cleaned panels were then immersed into the $H_2ZrF_6$-modified APSMS solution T6-C of Table 1 for 60 Seconds, which was immediately followed by two DI water rinse steps. The treated Al was then coated with MIL-DTL-53030B and MIL-PRF-23377J primers using HVLP spray and room-temperature cure. The dry film thickness was controlled at about 1 mil or 25 µm. The former primer is solvent-borne. A 2500-hr SST result is shown in Table 7. The controls were two commercial Zr-based products and a standard chromate pretreatment used in the aerospace industry.

TABLE 7

2500-hr SST results for AA2024-T3 under primers

| Sample ID | DFT (mil) | Creep (mm) |
| --- | --- | --- |
| MIL-DTL-53030B Primer[1] | | |
| T6-C | 0.9 | 0 |
| Chromated | 0.9 | 0 |
| Commercial 1 | 1.0 | Large delamination |
| Commercial 2 | 0.9 | Large delamination |
| MIL-PRF-23377J Primer[2] | | |
| T6-C | 1.1 | 0 |
| Chromated | 1.2 | 0 |
| Commercial 1 | 1.1 | Blisters |
| Commercial 2 | 1.2 | 0 |

[1]Water-based, No Cr(VI)
[2]Solvent-based, Cr(VI)-containing

It is observed in this Table that the T6-C treatment outperforms the current commercial Zr-based products and that its results are at least equal to those of chromate pretreatment. These results demonstrate that APSMS/$H_2XF_6$ (X=Ti and/or Zr) can be used on aerospace alloys as metal pretreatments under both water-borne and solvent borne primers and with or without Cr(VI)-containing pigments.

Thus, the coating composition of the present invention allows the metal surface to be coated with a silsesquioxane hexafluoro metallic acid blend and immediately rinsed with deionized water before the initial coating dries. This surface, while still wet, can be electrocoated and will provide improved corrosion resistance. As this combination provides enhanced corrosion resistance, it is also suitable for other coating methods such as spray coating, powder coating, immersion coating, and the like.

This has been a description of the present invention along with the preferred method of practicing the invention. However, the invention itself should only be defined by the appended claims, WHEREIN WE CLAIM.

What is claimed is:

1. A method of coating a metal surface comprising applying an aqueous pre-treatment coating composition to said metal surface to form a pre-treated coating metal surface, wherein said pre-treatment composition comprises
a waterborne silsesquioxane or mixture of waterborne silsesquioxanes; and
a water-soluble acidic zirconium composition.

2. The method claimed in claim 1 wherein the acidic zirconium composition a hexafluorozirconic metallic acid.

3. The method claimed in claim 2 wherein said metal surface is coated with a phosphate coating prior to being pre-treated with said pre-treatment coating composition.

4. The method claimed in claim 2 wherein said acid composition further comprises $H_2TiF_6$.

5. The method claimed in claim 4 wherein said acid composition comprises from 1% to 50% $H_2TiF_6$ on a mass basis.

6. The method of claimed in claim 1 wherein said coating metal surface is rinsed before said pre-treatment coating composition dries and is subsequently electrocoated.

7. The method claimed in claim 1 wherein the silsesquioxane is an oligomer formed from two silane precursors or silsesquioxanes at least one of which having an amine group.

8. The method claimed in claim 7 wherein said oligomer is aminopropylsilsesquioxane, methylsilsesquioxane or aminopropylsilsesquioxane.

9. The method claimed in claim 1 wherein said metal is selected from the group consisting of cold rolled steel, hot dipped galvanized, hot rolled steel, electrogalvanized stainless steel, Al and Mg, and alloys thereof.

10. A method of coating a metal surface comprising applying a phosphate or zirconium pretreatment to said metal surface to form a pretreated metal surface and subsequently coating said pretreated metal surface with an aqueous-based coating composition comprising
   a waterborne silsesquioxane or mixture of waterborne silsesquioxanes and a water-soluble acidic zirconium composition.

11. The method claimed in claim 10 wherein said silsesquioxane includes an amine group.

12. The method claimed in claim 10 wherein the acidic zirconium composition is a hexafluorozirconic acid.

* * * * *